Sept. 16, 1969   D. R. JONES   3,467,122
LIQUID LEVEL SENSOR

Filed Sept. 27, 1965   2 Sheets-Sheet 1

INVENTOR
DONNIE ROLAND JONES

BY Hurwitz & Rose
ATTORNEYS

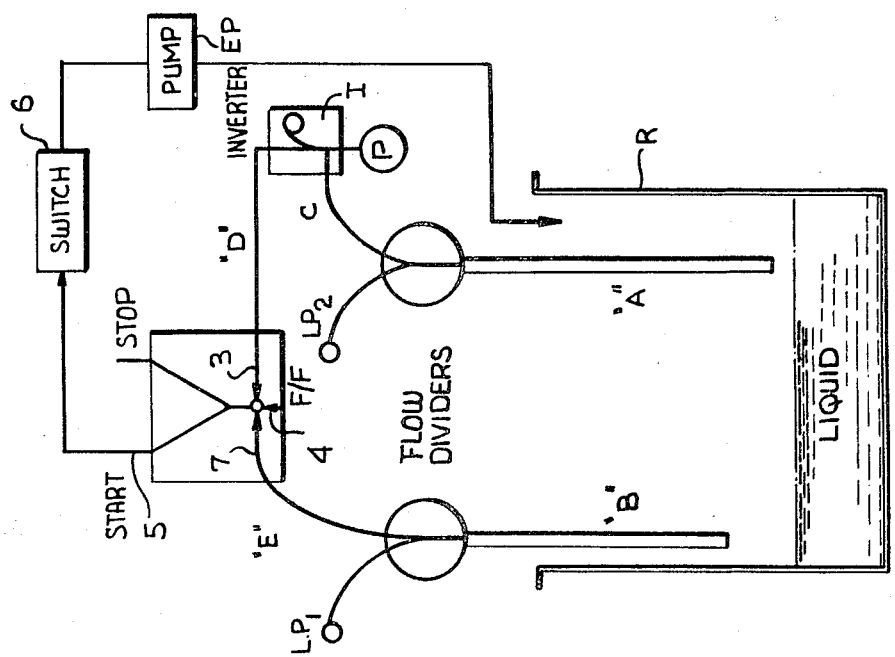
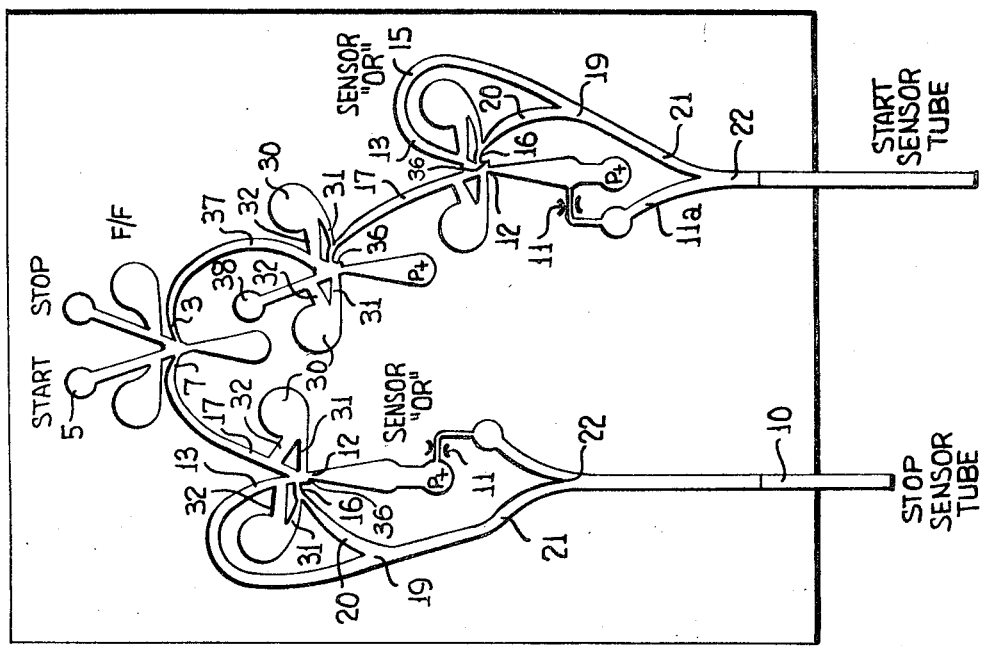

United States Patent Office 3,467,122
Patented Sept. 16, 1969

3,467,122
LIQUID LEVEL SENSOR
Donnie Roland Jones, Silver Spring, Md., assignor to Bowles Engineering Corporation, Silver Spring, Md., a corporation of Maryland
Filed Sept. 27, 1965, Ser. No. 490,246
Int. Cl. F15c 1/10
U.S. Cl. 137—81.5
15 Claims

ABSTRACT OF THE DISCLOSURE

A fluidic liquid level sensor comprising a sensor tube adapted to continuously discharge gas unless blocked by the liquid level being sensed and a bistable pure fluid amplifier having a control nozzle and a power nozzle for issuing a gaseous power stream to either of two output passages. A feedback path connects one of said output passages to said sensor tube and to said control nozzle so that when the sensor tube is not blocked by the sensed level of liquid, gas in said feedback path flows through the sensor tube and aspirates gas from the control nozzle to lock the amplifier in one of its two states. When the sensor tube is blocked by the sensed liquid level, gas in the feedback path flows through the control nozzle to deflect the power stream thereby switching the amplifier to the other of its states. Back pressure in the blocked sensor tube acts via the control nozzle to maintain the amplifier in said other state.

---

The present invention relates generally to liquid level sensors and more particularly to logic systems for pure fluid sensing systems responsive to liquid levels with respect to a predetermined reference for generating stable control signals in the presence of perturbations.

Pure fluid liquid level sensors can operate by blowing air from a sensor tube and sensing whether the exit of the sensor tube is blocked by the liquid or not blocked. The sensor tube exit can be located at any desired level, and accordingly can provide a signal indicating whether liquid level is above or below that level. By means of more elaborate systems utilizing two sensor tubes having exits at two different levels, more elaborate controls can be effected.

It is not desirable to draw air into a liquid level sensor tube, since inevitably liquid would be drawn in. Accordingly, the present liquid level system operates by blowing air out of the sensor tubes. This procedure has the defect that the air blown onto the surface of the liquid produces bubbles and consequently perturbations of pressure in the sensor tube, resulting in a noisy, impositive signal. According to the present invention the passage of air out through the sensor tube causes aspiration of air from a control tube. The latter is used to control a pure fluid gate, which is essentially stable and fails to operate in response to a noisy control signal.

It is, accordingly, a primary object of the invention to provide a pure fluid liquid sensor which is operative to detect whether liquid level is above or below a predetermined level, and which provides stable two state responses in the presence of bubbling on the liquid.

More broadly stated, the present invention pertains to a novel system of fluid logic. In accordance with this system, a two state pure fluid amplifier is provided with a feedback path which aspirates fluid from a control nozzle and thereby locks the amplifier in one of its states, that being the normal state of the amplifier in the absence of control signal. The feedback is then converted, in response to a control signal which closes the path of aspiration, into a feedback which operates to transfer the amplifier to its alternate state. The amplifier is normally in the one state, so that the first mentioned feedback reinforces that one state and may be called positive. Feedback is then converted to negative in response to the signal, and transfers the amplifier to its alternate state.

In the alternate state of the amplifier, the feedback path is eliminated, i.e., it is self-destructive. According to the invention, an alternative holding circuit is provided when the amplifier is in its alternate state. The holding circuit may be a second feedback path, or it may be a direct path. In accordance with a preferred embodiment of the invention, the aspirating signal itself, which is above referred to as positive, may be converted to a negative signal on occurrence of a sensed event, and thus itself operate to hold the amplifier in its alternate state. This is accomplished by reversing the direction of normally aspirating fluid flow, as by closing the aspirating path or channel.

It is, accordingly, an object of the invention to provide a novel bistable fluid logic element, in which transfer of state occurs on failure of an aspirating signal.

It is a further object of the invention to provide a bistable fluid logic element having a self-destructive feedback path of one type in one state of the amplifier, and which is converted to another type to transfer the state of the amplifier, while generating a holding signal for the alternate state.

A further object of the invention resides in the provision of a pure fluid flip-flop having a normal state, and having a feedback path which normally reinforces the normal state, which is provided with means for varying the character of the feedback to provide a transfer signal to effect an alternate state of the flip-flop.

While the present system is utilized for sensing liquid level, in a broad sense it operates in response to opening and closure of a sensor tube, regardless of the opening and closing mechanism or object. The latter may then be not only a body of liquid, but may be a solid object such as the finger of a person, a bi-metal, a humidity sensor, the armature of a relay or solenoid, or a sensed object on proximity detection. Operation of the system can be adjusted so that the system responds to partial closure, instead of only to complete closure, although this represents a degradation of the desired operation in liquid level detection.

The above and still further objects, features and advantages of the present invention will become apparent upon consideration of the following detailed description of one specific embodiment thereof, especially when taken in conjunction with the accompanying drawings, wherein:

FIGURE 3 is a view in plan of a physical embodiment of the system of FIGURE 2; and FIGURE 4 is a schematic diagram of a simplified version of the system of FIGURE 2.

Figure 1:
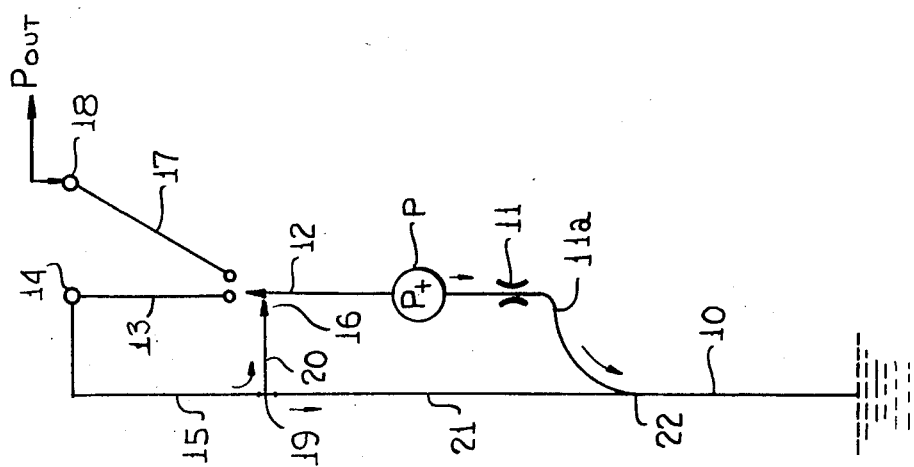
FIGURE 1 is a schematic diagram of a pure fluid logic system, according to the invention.

In FIGURE 1, 10 is a sensor tube which extends toward the surface of a body of liquid. Air under pressure is provided by a source P. This air proceeds via a constriction 11, in a path 11a, and down through sensor tube 10, which is thus provided with flow at reduced pressure. The full pressure of source P proceeds to power nozzle 12 of a pure fluid amplifier, where a jet of air is formed. The jet normally proceeds via duct 13, and from the output port 14 of duct 13 via feedback loop 15 extending to control nozzle 16. The latter is positioned to blow the jet away from duct 13, and into a duct 17, when air flows out of the control nozzle into the interaction region of the amplifier. The duct 17 is provided with an output port 18, which constitutes the effective output of the system. The feedback loop 15 divides at point 19, one divided path 20 extending to control nozzle 16 and the other, 21, joining the path 11a at location 22 of the sensor tube 10. The paths or ducts 21, 11a join the sensor tube 10, so that flow of fluid from source P, via duct or path 11a and into sensor tube 10 causes aspiration of air from paths or duct 21, thus reversing normal flow to control channel 20, or aspirating the latter.

In operation, the open end of sensor tube 10 may be (1) immersed in liquid, or (2) relatively remote from a liquid air interface externally of the liquid, or (3) very close to that interface without being immersed in the liquid.

When the exit of sensor tube 10 is in condition (2), air flowing via path or duct 11a aspirates air from path 21 and from control nozzle 16 via channel 20. In addition, air flow in feedback channel 15, having a relatively low impedance path to atmosphere via channel 21 and sensor tube 10, bypasses the channel 20, and in fact is designed to assist in aspirating channel 20. The jet issuing from nozzle 12 then issues to channel 13 and is not subject to noise like oscillations or perturbations due to minor changes in pressure at the exit of sensor tube 10.

Under condition (3) the outlet of sensor channel 10 is partially blocked by the liquid in which it is immersed, but sufficient flow occurs to maintain tube 10 clean and free of liquid. The total impedance as seen by channel 11a is decreased, and bypass of feedback path 15 through channel 21 is decreased, but insufficiently to effect transfer of the power jet. As the exit sensor of tube 10 approaches closer and closer to the surface of a body of liquid, bubbles develop at the exit. Impedance looking out of sensor tube 10 is therefore not constant.

If the exit of tube 10 is blocked flow of air from control nozzle 16 becomes sufficient to blow the power jet into channel 17. At that time no feedback exists via loop 15. However, the jet is then unlocked from channel 13, and can in response to slight control flow be maintained toward channel 17. Once the end of sensor tube is fully immersed in liquid, a major part of the fluid flowing in channel 11a is available for control flow and operation is stable, the power jet being deflected to channel 17. The transition range, as the end of sensor tube 10 approaches close to the body of liquid, is crucial for accurate measurement and control of liquid level. In this range, oscillations or perturbations can occur, i.e., erratic response, at output from port 18, because presence of a bubble at the exit can tend to trigger the system. It is a function of the system to avoid the latter possibility.

The operation of the system can then be most simply envisaged, as involving a jet which is very strongly and stably locked into channel 13, by inherent lock-on due to amplifier configuration, supplemented by the action of an aspiration control nozzle, so that transient, relatively weak reductions in aspiration will not detach the jet. So long as the end of sensor tube 10 is uncovered, feedback fluid via channel 15 is passed into channel 21, and duct 20 is aspirated, so that the jet remains locked into channel 31. As the end of sensor tube 10 approaches the liquid surface, bubbles occur at the surface. These are blown aside by the continuous flow from duct 11a, but cause variations of impedance. Such variations do not reduce bypass of the feedback channel 15 sufficiently, or reduce aspiration of control channel 20 sufficiently, that control signal of proper sign and amplitude is developed to blow the power jet from channel 13 to channel 17. However, once the end of sensor tube 10 is immersed, aspiration from duct 21 is largely terminated, and the flow into channel 11 turns from negative, i.e., out of duct 21 via sensor tube 21, to positive, i.e., from duct 11a, to duct 21, to control channel 20. At the same time feedback flow in channel 15 no longer aspirates channel 20 but instead supplies high pressure fluid thereto. A heavy flow then occurs in control channel 20, which blows the power jet to channel 17. This action terminates feedback via loop 15, but flow continues into control channel 20 via channel 21, which is sufficient to hold the power jet in its deflected condition, once deflection has occurred.

In the actual construction of a system according to the invention, the design of the pure fluid amplifier may be such that lock-on of the power jet exists, when the power jet issues into channel 13. Therefore, so long as a relatively strong control jet does not issue from control nozzle 16, no transfer of state can occur, and the system is impervious to perturbations. Partial blockings of sensor tube 10 may then be inadequate to transfer state. However, this condition can be weakened, if the system is required to operate on partial blockage.

Once sensor tube 10 is fully blocked, full feedback signal is momentarily available, constituted of the entire power of the main jet. This power is sufficient to detach the main jet and effect its deflection. The feedback loop is self-destructive so that once detachment has occurred only power flowing via duct 11a is available to maintain the main jet deflected, but this is sufficient.

When the sensor tube is again uncovered, the holding force is removed and the main jet returns to its initial state. This action re-establishes a holding circuit via feedback loop 15, due to aspiration of control nozzle 16 as well as the inherent internal lock-on to which the jet is subject.

Accordingly, the circuit of FIGURE 1 is essentially a flip-flop which is highly stable in an initial normal state, being held in that state by amplifier configuration reinforced by an aspirating feedback circuit, which may be called a positive feedback circuit since the feedback reinforces the initial state. In response to a signal, i.e., closure of a sensor tube, aspiration varies and the feedback circuit becomes a strongly negative feedback circuit, and transfers state of the flip-flop, overcoming the lock-on force provided by the amplifier configuration. The transfer of state destroys the feedback loop, but the signal simultaneously initiates a holding force, which is relatively weak, but sufficient in the then condition of the amplifier. On removing the signal by opening the sensor tube, the holding force disappears, whereupon the flip-flop returns to its initial state, and the positive feedback signal reappears to reinforce that state.

In FIGURE 4 is illustrated schematically a system for controlling liquid level. Assume the liquid is at the level illustrated, i.e., below the levels of sensor tubes A and B. Flow from low pressure sources LP1 and LP2 then exhausts via the sensor tubes A and B, and O flow (in the sense of computer logic) occurs to the channels C and E. Inverter I converts a 0 signal at its input to a 1 signal at its output. The 1 signal proceeds to control jet 3 of flip-flop FF, transferring the latter to its start condition, i.e., causing a power jet issuing from power nozzle 4 to proceed to channel 5. Fluid flow from channel 5 closes a pressure operated switch 6, which activates an electric pump EP, to provide liquid in receptacle R.

Liquid level now rises until sensor A exit is covered. At that time fluid from source LP2 flows as a 1 signal to inverter I, which supplies a 0 signal to flip-flop FF. This reinforces the action of the flip-flop but does not cause a change of state. Liquid therefore continues to flow. Eventually, liquid level attains and blocks the exit of sensor tube B. Thereby fluid from source LP1 is no longer exhausted, and is instead applied to channel E and therefrom to control nozzle 7, of flip-flop FF, causing it to change state and opening switch 6, which terminates supply of liquid.

Should liquid level now fall below the level of sensor tube B, flow in channel E will terminate. This does not change the state of flip-flop FF, but does render the flip-flop respective to a start signal by removing flow from control nozzle 7. When the liquid level drops below the exit of sensor A flip-flop FF receives a start signal from inverter I and the electric pump EP again fills receptacle R.

Figure 2:
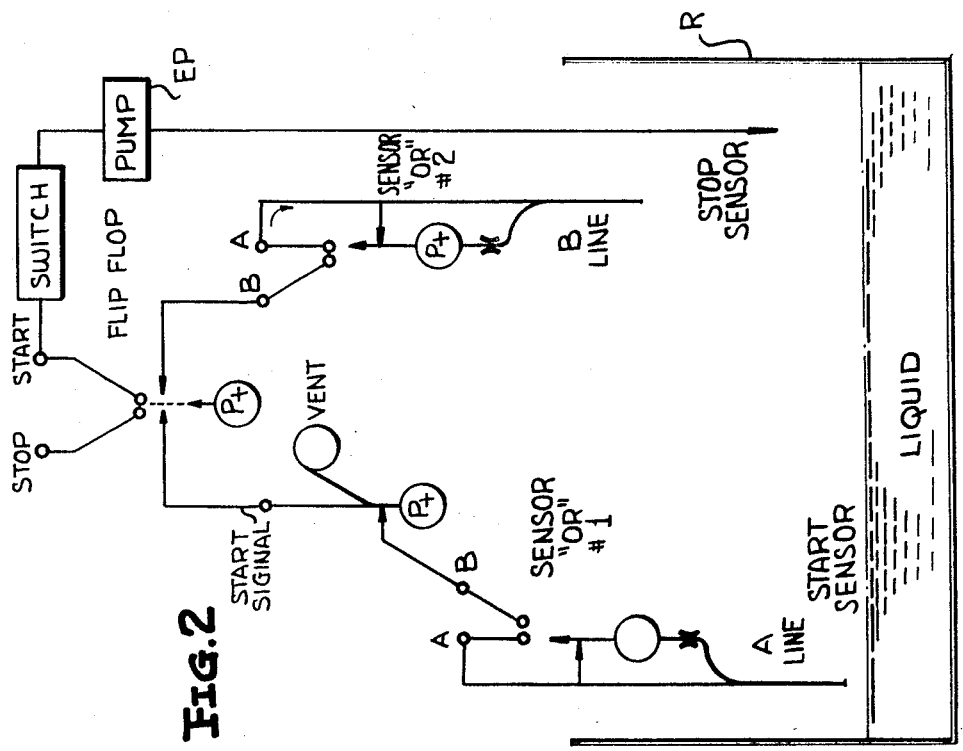
FIGURE 2 is a schematic diagram of a pure fluid system employing the logic of the system of FIGURE 1 to provide differing responses according as one or two sensors operate, the system being employed to maintain liquid level above one value but not above another.

The system of FIGURE 2 is a sophisticated version of the system of FIGURE 4, employing as it does the logic of FIGURE 1 in conjunction with sensor tubes A and B. Accordingly, the same numerals of reference identify corresponding parts in the several figures, and detailed duplicate exposition of the operation of the broad system of FIGURE 4 or of the logic of FIGURE 1 is dispensed with.

While reference is made to prior applications Ser. No. 252,432, filed Jan. 18, 1963, in the name of John R. Colston, assigned to the assignee of the present application, particularly FIGURE 6, for a complete exposition of the amplifiers of FIGURE 3, clarifying remarks are made, as follows:

In FIGURE 3, power source P+ supplies fluid under pressure to nozzle 12. A slight indent 36 is provided on the lock-on side of nozzle 12 to provide lock-on of the power jet to the output channel 13. The latter leads to feedback path 15, which at junction 19 branches to a control signal channel 20. The angle α between channels 15 and 20 facilitates aspiration from channel 20 while sensor tube 10 is open. Vents 30, 31 provide bleed off to prevent interference of trapped fluid with normal and desired action of control jet 16.

Inverter I includes a power source P+ which is constrained by indent 36 to flow normally to channel 37, channel 38 being a vent. Control signal supplied by channel 17 then serves to vent the main jet of inverter I, but in the absence of control signal the output of the inverter proceeds to control jet 3 of flip-flop FF. The latter is conventional. With these remarks the mode of physically realizing the system of FIGURE 2 is believed clear, and accordingly further detailed operation is dispensed with.

What is claimed is:

1. A pure fluid system, comprising:
 a power nozzle for issuing a power jet,
 means constraining said power jet to normally flow in a first direction,
 means comprising a control nozzle for diverting said flow in a second direction in response to a control stream,
 a first passage for collecting said power jet when said power jet flows in said first direction of flow,
 a second passage for collecting said power jet when said power jet flows in said second direction,
 a feedback passage from said first passage to said control nozzle,
 a sensor tube having selectively an open and a closed condition,
 means continuously flowing first fluid from said sensor tube at least while in said open condition, and
 means for diverting flow from said feedback path through said sensor tube, while said sensor tube is in said open condition.

2. The combination according to claim 1 wherein the last mentioned means is a further passage joining said sensor tube and said feedback path.

3. The combination according to claim 2 wherein is provided a common junction for said feedback passage, said control nozzle and said further passage, whereby fluid diverted from said feedback path through said sensor tube aspirates said control nozzle.

4. A system of pure fluid logic, comprising:
 a mono-stable pure fluid logic element,
 means generating a feedback pure fluid signal and an aspirating pure fluid signal simultaneously in said logic element for controlling the state of said logic element,
 means applying said feedback and aspirating pure fluid signals jointly to said monostable pure fluid logic element while said monostable pure fluid logic element is in its stable state and in such sense that said feedback pure fluid signal tends to maintain said pure fluid logic element to its stable state,
 means for transferring said pure fluid logic element to its unstable state, and
 means responsive to transfer of said pure fluid logic element to said unstable state for disabling said feedback pure fluid signal and concurrently converting said aspirating pure fluid signal to a pure fluid signal maintaining said pure fluid logic element in its unstable state.

5. The combination according to claim 4 wherein said means for generating an aspirating pure fluid signal includes:
 a sensor tube, and
 said means for generating a feedback pure fluid signal includes
  a feedback loop operable only while said pure fluid logic element is in its stable state.

6. In a liquid level sensing system:
 a liquid level sensing tube having first and second ends,
 means continuously flowing fluid from said first end of said sensing tube,
 a pure fluid logic device,
 means responsive to free flow of said fluid out of said first end of said tube for maintaining said pure fluid logic device in a first condition, and
 means responsive to blockage of said first end of said sensing tube by said liquid for transferring said pure fluid logic device to a second condition,
 wherein said pure fluid logic device includes a feedback path tending to transfer said pure fluid logic device to said second condition,
 means responsive to said flow of said fluid from said sensing tube for disabling said feedback path,
 means responsive to transfer of said pure fluid logic device to said second condition for destroying said feedback path, and
 means responsive to said blockage for providing a circuit for maintaining said pure fluid logic device in said second condition.

7. In a pure fluid system:
 a source of a jet of fluid,
 collector ports for said jet of fluid,
 control nozzle means for selectively deflecting said jet to said collector ports,
 a feedback path extending from one of said collector ports to said control nozzle means,
 a further channel connected to said feedback path,
 means for selectively aspirating fluid from and supplying fluid to said further channel, and
 means responsive to said last means when supplying fluid to said further channel for destroying said feedback path by deflecting said jet to the other of said collectors ports.

8. In a pure fluid system for maintaining flow of fluid intermediate first and second levels:
 substantially duplicate first and second pure fluid liquid level sensor means for sensing when said liquid attains said first level and said second level, respectively,
 a liquid supply capable of being enabled and disabled,
 means responsive to a predetermined operation of said first sensor means for enabling said liquid supply, and
 means responsive to a predetermined operation of said second sensor means for disabling said liquid supply.

9. The combination according to claim 8 wherein is provided:
 a signal inverter in cascade with only one of said substantially duplicate means, whereby said system generates signals of diverse character in response to identical conditions sensed by said duplicate liquid levelسensor means, and
 means responsive to said signals of diverse character for enabling and disabling said liquid supply, respectively.

10. In a pure fluid liquid level controller:
 a first sensor tube having a first exit,
 a second sensor tube having a second exit, said first and second exits being at higher and lower levels with respect to a body of liquid, respectively, means constantly delivering air to said sensor tubes for egress via said exits, means for diverting air flow from said sensor tubes into first and second channels on closure of said first and second exits, respectively, an inverter connected in cascade with said second channel, a pure fluid flip-flop having pure fluid inputs and pure fluid start and stop outputs, means for connecting said pure fluid inputs to said channels respectively, means responsive to flow of fluid from said inverter for transferring the state of said pure fluid flip-flop to its start output, and means responsive to flow of fluid from said first channel for transferring the state of said pure fluid flip-flop to said stop channel.

11. The combination according to claim 10 wherein is provided:

a liquid supply device, and means responsive to output only from said start channel for operating said liquid supply device to raise said liquid level.

12. The combination according to claim 11 wherein is provided:

a separate pure fluid two state logic element in cascade with each of said pure fluid inputs of said pure fluid flip-flop, said logic elements each including means for preventing transfer of state in response to perturbed input signals.

13. In a system for controlling liquid level:

first pure fluid means for sensing that said liquid level is below a first relatively low level, second pure fluid means for sensing that said liquid level is below a second relatively high level, means responsive only to both said sensing means simultaneously for increasing said liquid level, and means including said first and second pure fluid means responsive to sensing of said liquid level above said relatively high level only for terminating increasing of said liquid level.

14. In a liquid level control system:

a fluid amplifier having a power nozzle, a control nozzle, a first fluid receiving port, said power nozzle issuing a power jet, said fluid amplifier including means constraining said power jet normally to issue into said first fluid receiving port, a feedback channel extending from said first fluid receiving port to said control nozzle and normally providing fluid to said control nozzle tending to transfer said power jet to said second fluid receiving port, a sensor port opening to a low pressure region, a channel between said sensor port and said feedback channel, whereby feedback fluid issues from said feedback channel via said sensor port while said sensor port is open and aspirates fluid from said control nozzle to lock said power jet to issue into said first fluid receiving port, thereby disabling normal feedback of said feedback channel, a utilization device connected to said second fluid receiving port, and means forcing fluid into said sensor port continuously.

15. In a liquid level sensing system:

a liquid level sensing tube, means for continuously flowing fluid from said first end of said sensing tube;

a pure fluid logic device;

means responsive to free flow of said fluid from said sensing tube for maintaining said pure fluid logic device in a first logic state;

means responsive to blockage of said sensing tube by said liquid level for transferring said pure fluid logic device to a second logic state;

wherein said pure fluid logic device includes a feedback path for transferring said pure fluid logic device to said second logic state from said first logic state;

means responsive to said flow of said fluid from said sensing tube for disabling said feedback path;

means responsive to transfer of said pure fluid logic device to said second logic state for destroying said feedback path, and means responsive to said blockage of said sensing tube for maintaining said pure fluid logic device in said second condition.

References Cited
UNITED STATES PATENTS

| | | | |
|---|---|---|---|
| 2,034,370 | 3/1936 | Beckwith et al. | 137—400 |
| 2,885,879 | 5/1959 | Bloom | 137—412 X |
| 3,168,105 | 2/1965 | Cisco et al. | 137—81.5 X |
| 3,193,197 | 7/1965 | Bauer | 137—81.5 X |
| 3,228,410 | 1/1966 | Warren et al. | 137—81.5 |
| 3,232,095 | 2/1966 | Symnoski et al. | 137—81.5 X |
| 3,267,949 | 8/1966 | Adams | 137—81.5 |
| 3,277,914 | 10/1966 | Manion | 137—81.5 |

SAMUEL SCOTT, Primary Examiner